2 Sheets--Sheet 1.

E. GERRY.
Bee-Hive.

No. 6,499. Reissued June 22, 1875.

WITNESSES:
P. C. Dieterich
W. C. McArthur

INVENTOR:
Edson Gerry
per
C. H. Watson & Co
ATTORNEYS.

THE GRAPHIC CO. PHOTO-LITH. 39 & 41 PARK PLACE, N.Y.

2 Sheets--Sheet 2.
E. GERRY.
Bee-Hive.
No. 6,499.
Reissued June 22, 1875.
Fig. 3.
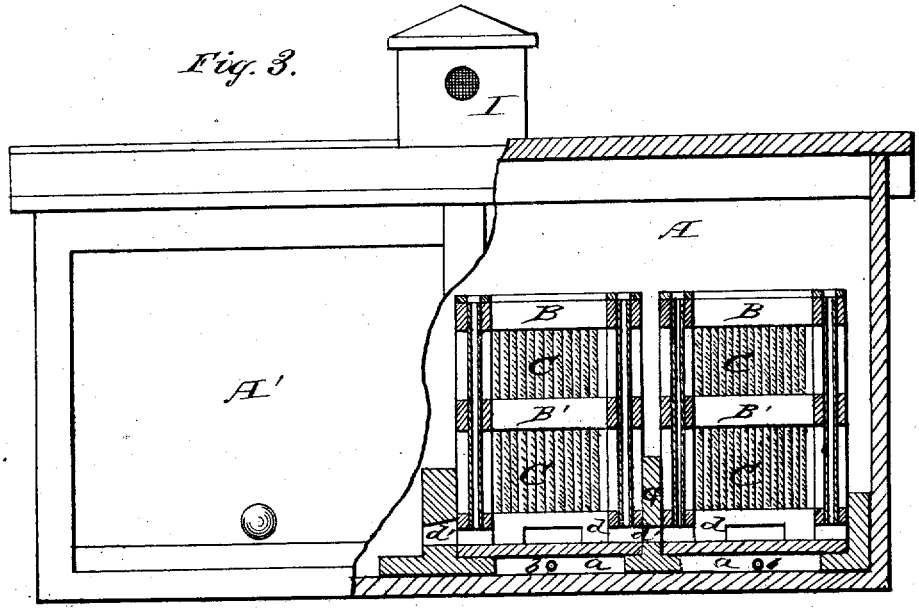
Fig. 4.
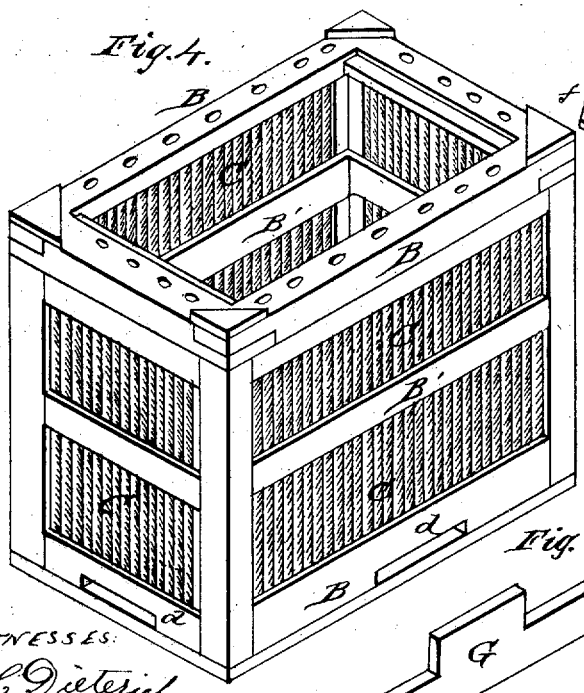
Fig. 5. H
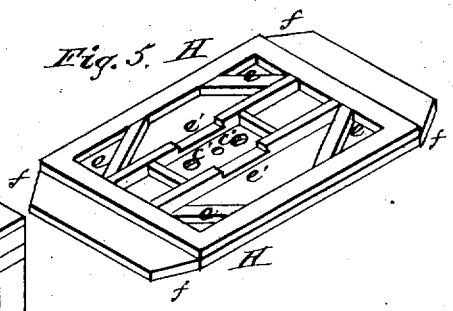
Fig. 6.
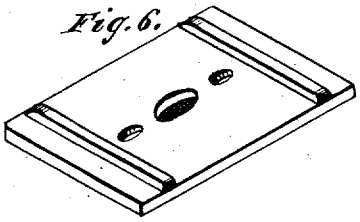
Fig. 7.
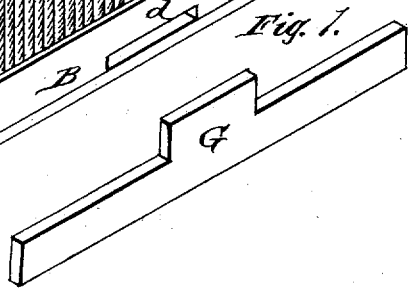
WITNESSES:
P. C. Dieterich.
W. C. McArthur.
INVENTOR.
Edson Gerry
per C. H. Watson & Co.
ATTORNEYS
THE GRAPHIC CO. PHOTO-LITH. 39 & 41 PARK PLACE, N.Y.

UNITED STATES PATENT OFFICE.

EDSON GERRY, OF GARDEN CITY, MINNESOTA.

IMPROVEMENT IN BEE-HIVES.

Specification forming part of Letters Patent No. 161,606, dated April 6, 1875; reissue No. 6,499, dated June 22, 1875; application filed May 18, 1875.

*To all whom it may concern:*

Be it known that I, EDSON GERRY, of Garden City, in the county of Blue Earth and State of Minnesota, have invented certain new and useful Improvements in Bee-Hives; and I do hereby declare that the following is, a full, clear, and exact description thereof, that will enable others skilled in the art to which it appertains to make and use the same, reference being had to the accompanying drawings, and to the letters of reference marked thereon, which form a part of this specification.

The nature of my invention consists in the construction and arrangement of a sectional bee-hive, as will be hereinafter more fully set forth.

Figure 1:
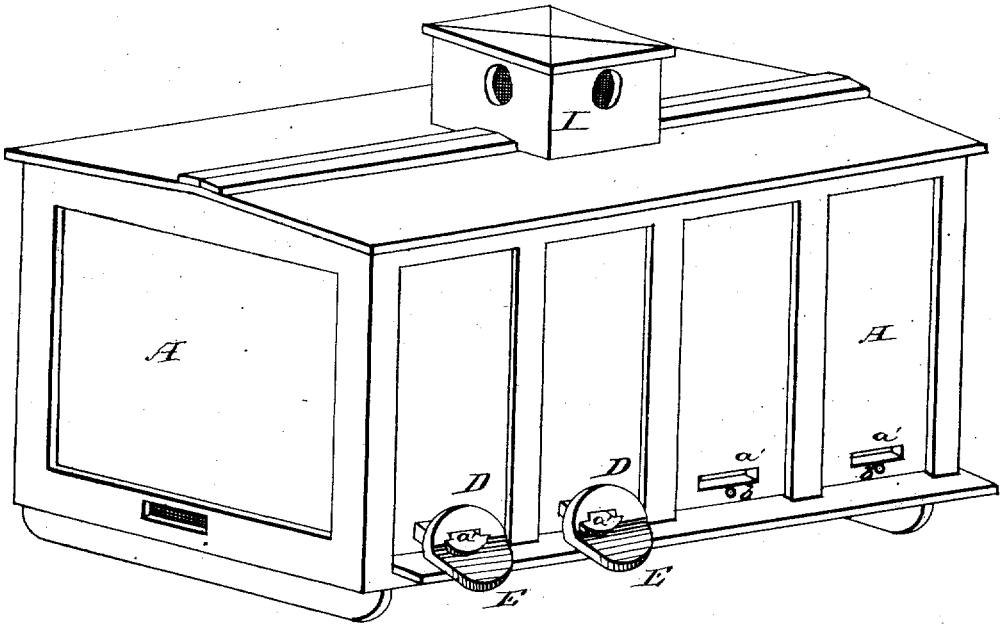
Figure 2:
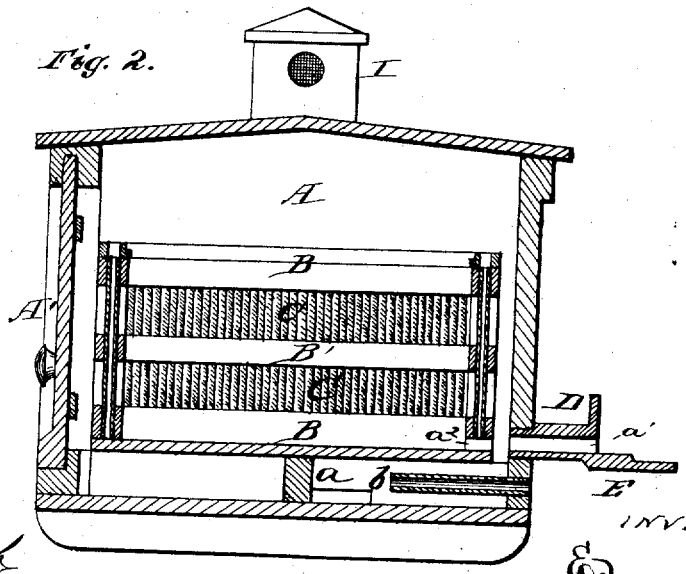

In the annexed drawings, Figure 1 is a perspective view of my bee-hive. Fig. 2 is a transverse vertical section of the same. Fig. 3 is a rear elevation, partly in longitudinal section. Fig. 4 is a perspective view of one of the sections; and Figs. 5, 6, and 7 are detached views of certain parts thereof.

A represents the exterior shell or case, in which the sections are placed. On the bottom of the shell A are cross-bars, suitably arranged to receive the sections and form under each section a closed chamber, *a*, which forms the moth-trap. The sections are made of frames B B, and filled in around with bulrushes, flags, prairie-grass, or other material, C, that will absorb the moisture that accumulates from the breath, thereby keeping the bees in a dry and healthy condition. These rushes or flags are secured at the top and bottom of the frame B, and secured at or near the center by cross-bars B′, by which means the rushes can be secured and held firmly together. The sections B C are arranged side by side, all fronting the same way, to be drawn out on the back side of the case for examination or otherwise, the case being provided with tight-fitting doors A′ on the back. On the front of the case A is an alighting-board, E, with extended entrance D for each section. These extended entrances are of great advantage, as it gives greater facility for guarding the hive. The upper portion of the board E forms a passage, $a^1$, to the inside of the case A, and the sections B are also provided with a passage, $a^2$. The frames or sections B are set a little distance from the case A, leaving a dead-air chamber between the sections and case of about two inches. The tube *b* underneath the alighting-board E forms a passage into the chamber *a* for the reception of the moth. The bees pass through the passage formed on the board E, while the moth, being attracted by the scent of the bees through the tube *b*, pass through said tube into the moth-chamber *a*. The wire-cloth or glass, being placed at the bottom of the moth-chamber, permits the light to enter, and attracts the moth from the tube *b* to the extreme part of the chamber *a*, where they try to get out until they become weary and weak, and die for want of food, thus disposing of all the moth that chance to enter the moth-chamber. The sections have passages *d* through them for the bees to pass from one to the other, the passages communicating between adjoining sections at *d′*. The passages *d* may be closed by reversing the board G, (shown in Fig. 7, and in position in Fig. 3,) when changing sections, or for any purpose desired to cut off communication between the sections. Each section is to be provided with suitable comb-frames for the bees to build their comb on, and form the brood-chamber, the boxes for the surplus honey running crosswise across the frames, with no honey-board between the boxes and frames.

The upper side of the honey-board is constructed with boxes *e e*, as shown, for the reception of water, salt, rye-flour, sirups, or other material used as feed for the bees. This board H has perforations *c′ c′*, and cut away at *e′ e′*, so that the bees have a free passage over the board. The corners of the board are cut off at *f*, and the tops of the frames are provided with blocks *f′* of corresponding form, so that the board H fits on the frames or sections B, forming a feed-box, while the under portion forms a cover for the comb-frames.

On top of the case A is a ventilator, I, of suitable construction.

Around the top of each section and outside are holes to pass off the moisture outside the honey-board, that is absorbed by the rushes or other material used, keeping the inside of the section dry and free from mildew.

The arrangement of two or more sections in a case is for the purpose of retaining the animal heat that passes through the rushes into the case, equalizing the heat through the different sections, and for the purpose of creating swarms and rearing queens without injuring the main colony.

Having thus fully described my invention, what I claim as new, and desire to secure by Letters Patent, is—

1. The extended entrance D, forming passage $a^1$, in combination with the sections having passages $a^2$, and the chamber $a$ and tube $b$, leading into the chamber $a$, and the entrance for the rays of light, all as and for the purposes set forth.

2. The sections, substantially as described, having passages $d$ $d$, in combination with the reversible board G and case A, as and for the purposes set forth.

3. The sections B, provided with a perforated frame around the top, with blocks $f'$, in combination with the board H, with cut corners and chambers $e$, perforations $c'$, and openings $e'$, forming a bee-feeder and a honey-board, all as and for the purposes set forth.

In testimony that I claim the foregoing, I have hereunto set my hand this 13th day of May, 1875.

EDSON GERRY.

Witnesses:
S. M. FARRAR,
EDWIN ELLIOTT.